United States Patent [19]
Tsukamoto et al.

[11] Patent Number: 5,674,154
[45] Date of Patent: Oct. 7, 1997

[54] HYDRAULIC CONTROL SYSTEM FOR AUTOMATIC TRANSMISSION

[75] Inventors: Kazumasa Tsukamoto, Toyota; Masahiko Ando, Okazaki; Akira Fukatsu; Toshiyuki Mae, both of Anjo; Motoyuki Sakai, Aichi-ken; Tetsuo Hamajima, Toyota; Masato Kaigawa, Toyota; Kagenori Fukumura, Toyota; Hidehiro Oba, Numazu; Yasuo Hojo, Nagoya; Atsushi Tabata, Okazaki; Nobuaki Takahashi, Toyota, all of Japan

[73] Assignees: Aisin Aw Co., Ltd.; Toyota Jidosha Kabushiki Kaisha, both of Japan

[21] Appl. No.: 562,388

[22] Filed: Nov. 24, 1995

[30] Foreign Application Priority Data

Dec. 2, 1994 [JP] Japan .................. 6-329492
Dec. 2, 1994 [JP] Japan .................. 6-329494

[51] Int. Cl.⁶ .................................................. F16H 61/26
[52] U.S. Cl. ................. 477/131; 477/143; 477/150
[58] Field of Search ..................... 477/143, 130, 477/127, 131, 138, 150, 151, 152

[56] References Cited

U.S. PATENT DOCUMENTS

| | | | |
|---|---|---|---|
| 4,718,311 | 1/1988 | Hayakawa et al. | 477/127 X |
| 4,982,624 | 1/1991 | Takada et al. | 477/131 X |
| 5,133,231 | 7/1992 | Goto et al. | 477/150 |
| 5,293,789 | 3/1994 | Goto et al. | 477/151 |
| 5,363,724 | 11/1994 | Asahara et al. | 477/143 X |
| 5,403,248 | 4/1995 | Ando et al. | 477/131 X |
| 5,433,124 | 7/1995 | Person | 477/131 X |
| 5,472,389 | 12/1995 | Ando et al. | 477/131 X |
| 5,501,645 | 3/1996 | Taniguchi et al. | 477/131 X |
| 5,505,673 | 4/1996 | Tsukamoto et al. | 477/130 |

Primary Examiner—Charles A. Marmor
Assistant Examiner—Peter T. Kwon
Attorney, Agent, or Firm—Lorusso & Loud

[57] ABSTRACT

A hydraulic control system for an automatic transmission to establish a predetermined stage by applying a first frictional engagement element and releasing a second frictional engagement element, comprising: a first hydraulic servo for actuating the first frictional engagement element; a second hydraulic servo for actuating the second frictional engagement element; change-over means for switching the feed of an oil pressure to the first hydraulic servo; signal pressure generating means for generating a signal pressure; and a pressure regulator valve for regulating the pressure to be fed to the second hydraulic servo. The pressure regulator valve includes: a first valve member having a first pressure receiving area to be fed with the signal pressure in one direction; a second valve member arranged coaxially with the first valve member and adapted to come into abutment against the first valve member in the other direction, the second valve member having a second pressure receiving area to be fed with the oil pressure to the first hydraulic servo in the other direction, when the oil pressure is fed by the change-over means; and bias means so disposed at the side of the second valve member axially opposed to the first valve member as to bias the second valve member into abutment against the first valve member.

8 Claims, 7 Drawing Sheets

|  | C-0 | C-1 | C-2 | B-0 | B-1 | B-2 | B-3 | B-4 | F-0 | F-1 | F-2 |
|---|---|---|---|---|---|---|---|---|---|---|---|
| N |  |  |  | ◌ |  |  |  |  |  |  |  |
| Rev |  |  | ○ | ○ |  |  |  | ○ |  |  |  |
| 1st | ○ | ○ |  |  |  |  |  | ● | ○ |  | ○ |
| 2nd | ● | ○ |  |  |  |  | ○ |  | ○ |  |  |
| 3rd | ○ | ○ |  |  | ● | ○ |  |  | ○ | ○ |  |
| 4th | ○ | ○ | ○ |  |  | ◉ |  |  | ○ |  |  |
| 5th |  | ○ | ○ | ○ |  | ◉ |  |  |  |  |  |

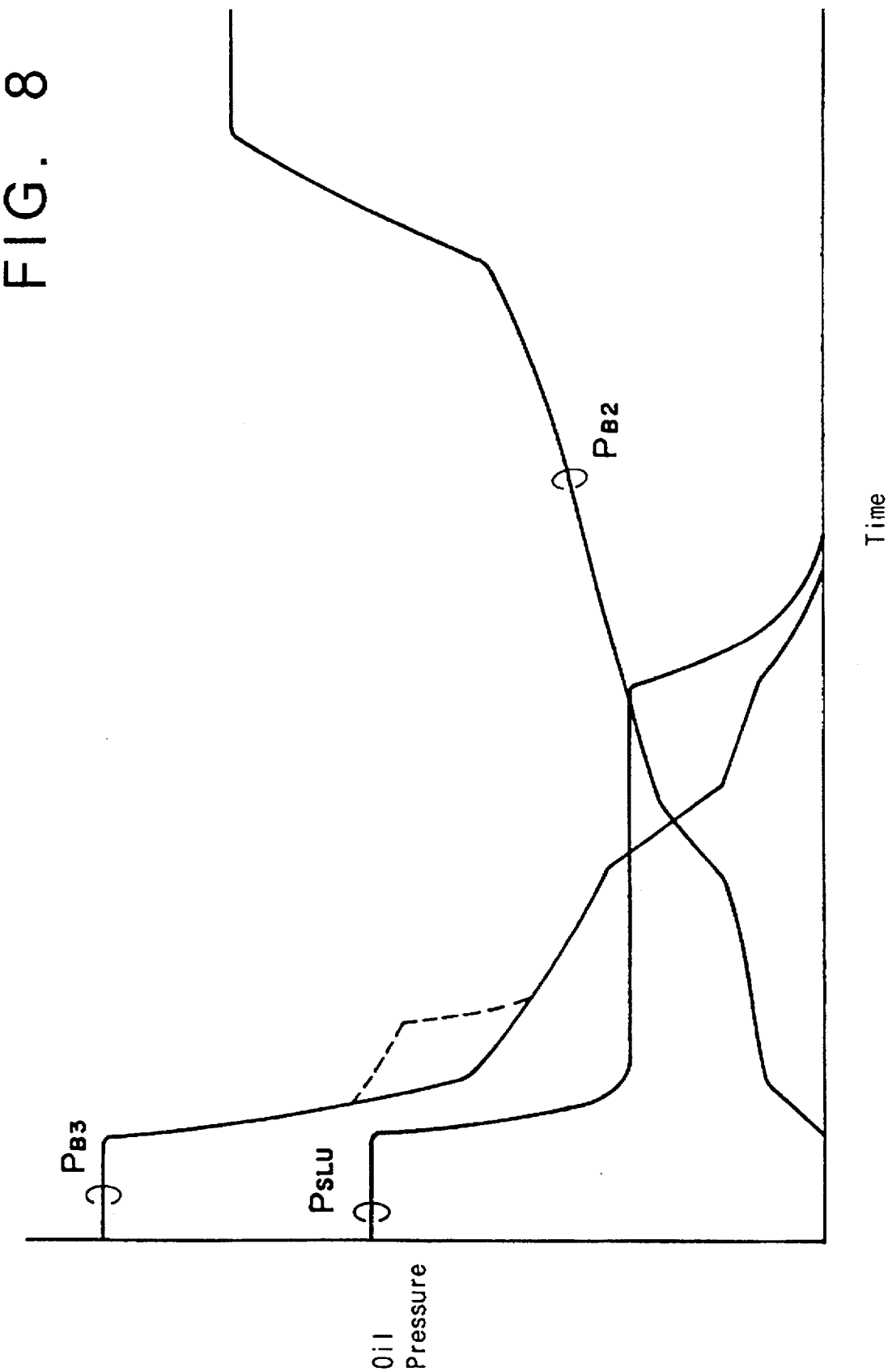

HYDRAULIC CONTROL SYSTEM FOR AUTOMATIC TRANSMISSION

BACKGROUND OF THE INVENTION

1. Field of the Invention

The present invention relates to a hydraulic control system for an automatic transmission and, more particularly, to a control system of a hydraulic servo for applying/releasing the frictional engagement elements in the transmission mechanism of the automatic transmission.

2. Related Art

In the prior art, the automatic transmission is required, depending upon the gear train construction, to effect the so-called "grip-changing operation" in which the application of one of two frictional engagement elements (e.g., brakes or clutches) and the release of the other are simultaneously performed at a time of shifting between specific two gear stages. In this case, in order to avoid the drop of the output shaft torque due to the tie-up and the engine racing due to the under-lap of two frictional engagement elements, there has been used not only a method of using one-way clutches but also a method of directly controlling the hydraulic servos of the two frictional engagement elements by a hydraulic control system. In order to effect this control method, there has been proposed by our Japanese Patent Laid-Open No. 142203/1994 a technique in which a control valve is arranged in an oil passage for feeding/releasing the oil pressure to/from a frictional engagement element at a releasing side so that it may be controlled in association with the applying pressure of a frictional engagement element at an engaging side. This preceding invention has adopted a construction in which the application of the applying pressure to the control valve is effected through a plunger, i.e, a second valve member made separate of a spool acting as a first valve member for regulating the pressure.

According to this construction, however, the second valve member for transmitting the applying pressure applied during a shift to the first valve member is set free, when fed with no oil pressure, and it may be brought apart from the first valve member by the vibration of the vehicle. If, in this state, the control valve is held with the releasing pressure of the released side frictional engagement element being regulated, the first valve member and the second valve member come into abutment against each other to leave a time lag till the applying pressure against the signal pressure reaches the state of the regulated pressure applied to the first valve member. As a result, there arises a problem that the control of regulating the releasing pressure is delayed.

SUMMARY OF THE INVENTION

It is, therefore, an object of the present invention to provide a hydraulic control system for an automatic transmission, which can control the releasing pressure of a released side hydraulic servo without delay when the releasing pressure is to be controlled in association with the applying pressure of an engaging side hydraulic servo, so that a predetermined gear stage may be established by applying a first frictional engagement element and releasing a second frictional engagement element.

In order to solve the above-specified problem, according to an aspect of the present invention, there is provided a hydraulic control system for an automatic transmission to establish a predetermined gear stage by applying a first frictional engagement element and releasing a second frictional engagement element, which system comprises: a first hydraulic servo for actuating said first frictional engagement element; a second hydraulic servo for actuating said second frictional engagement element; change-over means for switching the feed of an oil pressure to said first hydraulic servo; signal pressure generating means for generating a signal pressure; and a pressure regulator valve for regulating the pressure to be fed to said second hydraulic servo. The hydraulic control system is characterized in that said pressure regulator valve includes: a first valve member having a first pressure receiving area to be fed with said signal pressure in one direction: a second valve member arranged coaxially with said first valve member and adapted to come into abutment against said first valve member in the other direction, said second valve member having a second pressure receiving area to be fed with the oil pressure to said first hydraulic servo in the other direction, when said oil pressure is fed by said change-over means; and bias means so disposed at the side of said second valve member axially opposed to said first valve member as to bias said second valve member into abutment against said first valve member.

Thanks to such construction, according to the present invention, the position the second valve member having the second pressure receiving area to be fed the oil pressure to the first hydraulic servo in the other direction can be integrally fixed by the bias means although the second valve member is made separate of the first valve member having the first pressure receiving area to be fed with the signal pressure of the control valve in one direction. As a result, the second valve member is not brought apart from the first valve member by the vibration of the vehicle even if it has receives no oil pressure at its second pressure receiving area.

Thus, if the applying pressure by the feed of the oil pressure to the first hydraulic servo is applied to the second pressure receiving area when the feed of the oil pressure to the first hydraulic servo is started by the change-over valve, that is, when a predetermined gear stage is to be established by releasing the second frictional engagement element and by applying the first frictional engagement element, the control of regulating the releasing pressure can be quickly started to raise no response, delay because the first valve member and the second valve member are in abutment against each other. As a result, it is easy to control the pressure regulating characteristics of the hydraulic control system.

BRIEF DESCRIPTION OF THE DRAWINGS

FIG. 8 is a skeleton diagram showing the transmission mechanism portion of the automatic transmission;

FIG. 8 is a characteristic diagram of the oil pressures to be applied to the pressure regulator valve of the automatic transmission at the 2nd→3rd shifting time.

DESCRIPTION OF THE PREFERRED EMBODIMENT

Figures 3, 4:
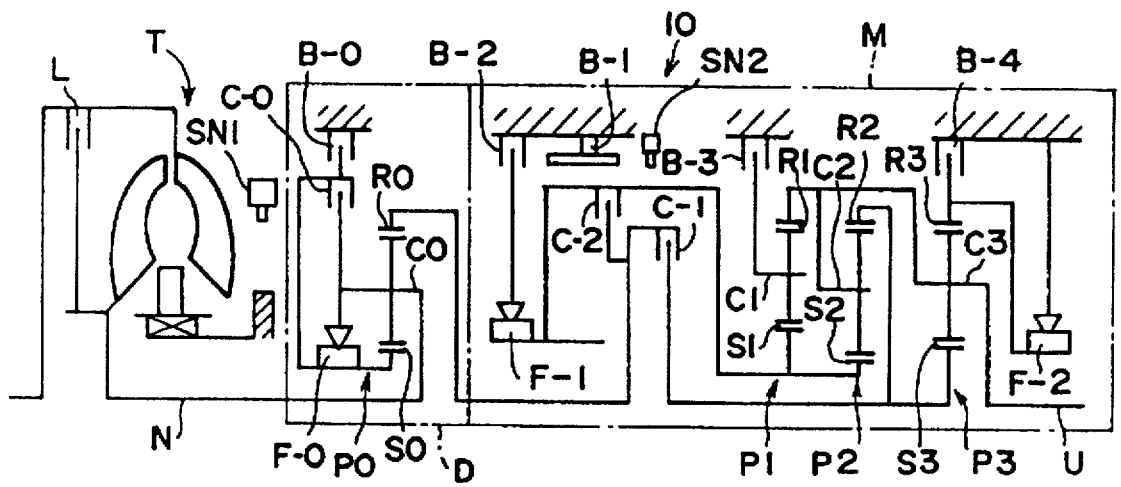
FIG. 4 is an operation chart of the automatic transmission.

The present invention will be described in the following in connection with its embodiments with reference to the accompanying drawings. Here will be described at first the schematic construction of the entirety of an automatic transmission. As shown in FIG. 3, an automatic transmission 10 has its mechanical portion constructed, in this embodiment, to have five speeds by combining an auxiliary transmission mechanism D composed of a pre-overdrive planetary gear unit and a main transmission mechanism M composed of a simply connected 3-planetary gear trains to establish four forward speeds and one reverse. The mechanical portion thus constructed is connected to a torque converter T having a lockup clutch L.

The auxiliary transmission mechanism D is equipped with: a one-way clutch F-0 in association with a sun gear S0, a carrier C0 and a ring gear R0; a multidisc clutch C-0 in parallel with the one-way clutch F0; and a multi-disc brake B-0 in series with the multi-disc clutch C-0. On the other hand, the main transmission mechanism M is equipped with three sets of simply connected gear units P1 to P3 in which are suitably directly connected the individual transmission elements composed of sun gears S1 to S3, carriers C1 to C3 and ring gears R1 to R3. The main transmission mechanism M is arranged with multi-disc clutches C-1 and C-2, a band brake B-1, multi-disc brakes B-2 to B-4, and one-way clutches F-1 and F-2 in association with the transmission elements of the individual gear units. Incidentally, in FIG. 2, reference characters SN1 designate a C0 sensor for detecting the drum rotation of the clutch C-0, and characters SN2 designate a C2 sensor for detecting the drum rotation of the clutch C-2. Moreover, the individual clutches and brakes are equipped with hydraulic servo units composed of piston-cylinder mechanisms for applying/releasing their friction members, although not shown.

Figure 5:
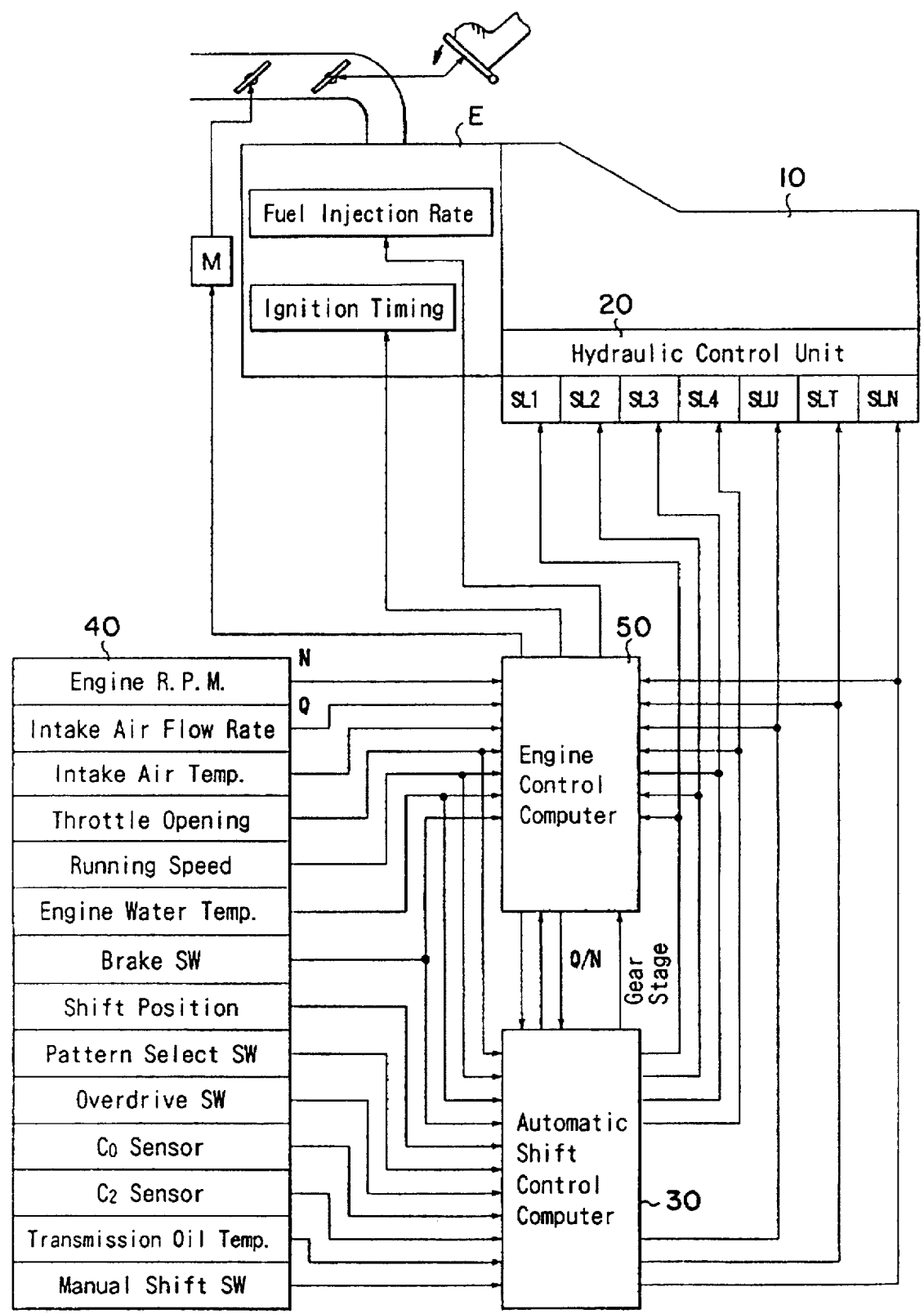
FIG. 5 is a block diagram showing a system construction of the automatic transmission.

As shown in FIG. 5, the automatic transmission 10 is equipped with: a hydraulic control system 20 for controlling the mechanical portion having the aforementioned construction, a torque converter and the lockup clutch; and the not-shown oil pump which is built in the mechanical portion as the oil pressure source for the hydraulic control system 20. The automatic transmission 10 is connected, when mounted on the vehicle, to an engine E and has its hydraulic control system 20 connected with an automatic transmission control computer 30 through individual solenoid valves SL1 to SL4 and individual linear solenoid valves SLN, SLT and STU, which are built in the hydraulic control system 20. The automatic transmission control computer 80 is connected with: a variety of sensors 40, which are arranged in the individual portions of the vehicle including the engine E and the automatic transmission 10; and an engine control computer 50.

In this automatic transmission 10, the rotation of the engine E shown in FIG. 5 is transmitted to the input shaft N of the auxiliary transmission mechanism D through the torque converter T shown in FIG. 8. Moreover, the rotation of the input shaft N is inputted to the sun gear S3 of the gear unit P3 under the control of the hydraulic control system with the clutch C-0 being applied to directly connect the auxiliary transmission mechanism D, with the clutch C-1 of the main transmission mechanism M being applied, with all the remaining frictional engagement elements being released, and is outputted as a 1st-speed rotation to an output shaft U from the carrier C3 by obstructing the backward rotation of the ring gear R3 by the one-way clutch F-2.

Next, a 2nd speed is established when the auxiliary transmission mechanism D is directly connected so that the clutch C-1 and the brake B-3 are applied. At this time, the input having entered the ring gear R2 of the gear unit P2 is outputted, by using the carrier C1 of the gear unit P1 as a reaction element, to the carrier C2 of the gear unit P2 and the ring gear R1 of the gear unit P1, as directly connected to the former, so that it establishes the 2nd-speed rotation of the output shaft U.

On the other hand, a 3rd speed is established, too, when the auxiliary transmission mechanism D is directly connected to apply the clutch C-1 and the brake B-2 while releasing the others. At this the input having entered the ring gear R2 of the gear unit P2 is outputted to the carrier C2 by using the sun gear S2 as a reaction element so that it establishes the 3rd-speed rotation of the output shaft U.

Moreover, a 4th speed is established, too, when the auxiliary transmission mechanism D is directly connected to apply both the clutch C-1 and the clutch C-2. At this time, the input rotation is inputted to the ring gear R2 and the sun gear S2 so that the gear unit, P2 is directly connected to output the input rotation as it is. Still moreover, a 5th-speed rotation is established, when the main transmission mechanism M is in the state of the aforementioned 4th-speed rotation, by releasing the clutch C-0 and applying the brake B-0 to fix the sun gear S0 thereby to accelerate the auxiliary transmission mechanism D. On the other hand, the reverse is established, when the auxiliary transmission mechanism D is in the aforementioned state, by applying the clutch C-2 and the brake B-4 of the main transmission mechanism M. At this time, the input having entered the sun gear S2 of the gear unit P2 is outputted as the backward rotations of the carriers C2 and C3 of the gear units P2 and P3 using the ring gear R3 as a reaction element.

The applied/released relations of the individual frictional engagement elements and the one-way clutches at the aforementioned individual gear stages are tabulated in the operation chart of FIG. 4. In FIG. 4: blank circles ○ designate the application for the clutches and brakes and the lock for the one-way clutches; solid circles ● designate the application only at the engine braking time; a broken circle ○ designates the application or release; and double circles ⊙ designate the application withdrawing the participation in the power transmission.

Figure 1:
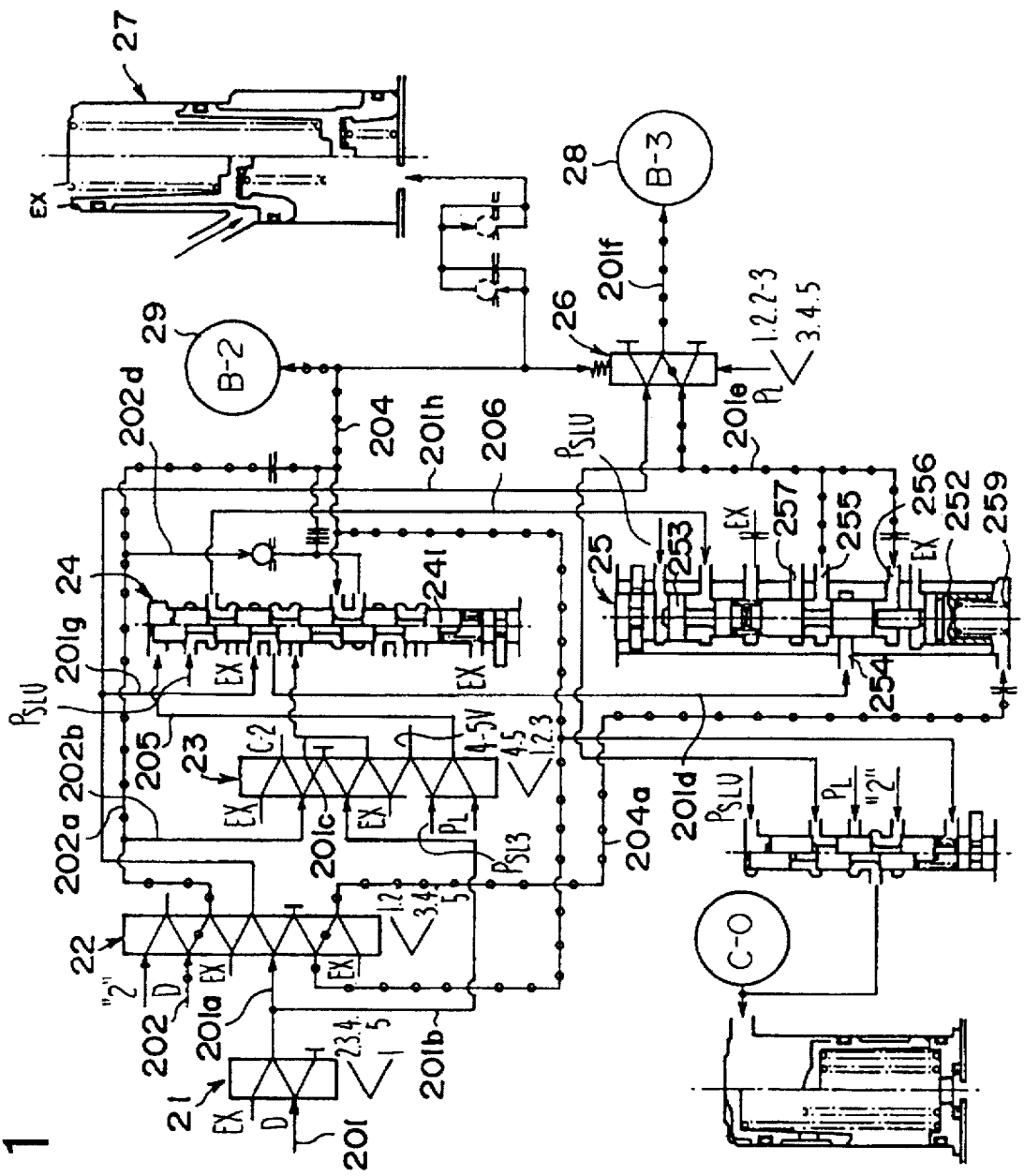
FIG. 1 is a circuit diagram showing a portion of a hydraulic control system for an automatic transmission according to an embodiment of the present invention together with its oil passage connections at a 2rd→3rd shifting state.

In the automatic transmission 10 thus constructed, according to the present invention, a first frictional engagement element is exemplified by the brake B-2, and the second frictional engagement element is exemplified by the brake B-3. As shown in FIG. 1, the circuit portion, which is directly related to the regulation and the feed/release of the oil pressure of the hydraulic servos 29 and 28 for applying/ releasing the individual friction members of the brake B-2 and the brake B-3 is arranged with a 1–2 shift valve 21, a 2–3 shift valve 22 constituting change-over valve, a 3–4 shift valve 23, a B-2 release valve 24, a B-3 control valve 25 constituting a pressure regulator valve, a relay valve 26 and a B-2 accumulator 27. These hydraulic components are controlled, as shown in FIG. 5, by the solenoid valves SL1 to SL4 for switching the individual shift valves, a linear solenoid valve SLU constituting signal pressure generating means for the lockup, the accumulator control linear solenoid valve SLN for controlling the B-2 accumulator 27 and its back pressure, the linear solenoid valve SLT for outputting a control signal according to the engine load (as exemplified by the throttle opening In the present embodiment), and so on.

Specifically, the present embodiment establishes a 3rd-speed gear stage by applying the brake B-2 and releasing the brake B-3 and is equipped with the first hydraulic servo 29 for actuating the brake B-2, the second hydraulic servo 28 for actuating the brake B-3, the 2–3 shift valve for switching the feed of the oil pressure to the first hydraulic servo 29, the signal pressure generating means (i.e., the aforementioned linear solenoid valve SLU and so on) for producing the signal pressure, and the B-3 control valve 25 for regulating the feed pressure to the second hydraulic servo 28.

Figure 2:
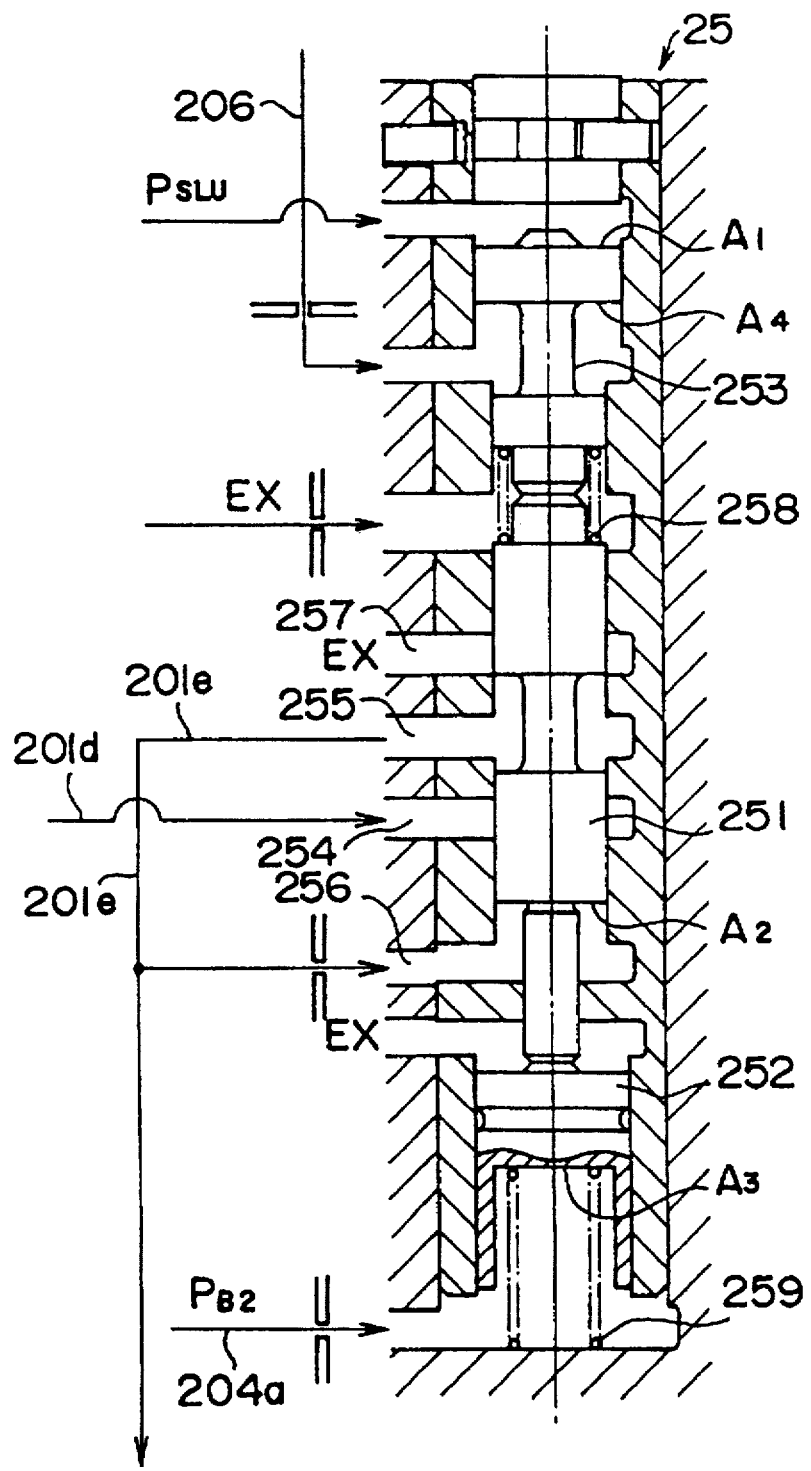
FIG. 2 is an enlarged section showing the detail of a pressure regulator valve of the hydraulic control system.

As shown in FIG. 2, the B-3 control valve 25 acting as the pressure regulator valve is composed the first valve member, i.e., a spool 251 and a plunger 253 having a first pressure receiving area to be fed with a signal pressure ($P_{SLU}$) in one direction and a pressure receiving area $A_2$ to be fed with a feedback pressure in the other direction from the second hydraulic servo 28; a plunger 252 acting as the second valve member arranged coaxially with the spool 251 and enabled to abut against the spool 251 in the other direction while having a second pressure receiving area $A_3$ to be fed with an apply oil pressure ($P_{B2}$) to the first hydraulic servo 29 in the other direction Then said oil pressure ($P_{B2}$) is fed; and a spring 259 acting as bias means disposed at the side of the plunger 252 axially opposite to the spool 251 for biasing the plunger 252 to abut against the spool 251.

Reverting to FIG. 1, the connections between the aforementioned individual valves and oil passages will be described in detail in the following. A D-range oil passage 201 leading to the not-shown manual valve is branched through the 1–2 shift valve 21, and one branch oil passage 201a is connected through the 2–3 shift valve 22 via an oil passage 201h to the relay valve 26 and further through the valve 26 to the brake B-3 oil passage 201f. The other branch oil passage 201b leads through the 3–4 shift valve 23, an oil passage 201c, the B-2 release valve 24 and the oil passage 201d to the input port 254 of the B-3 control valve 25, from which the oil passage 201b is connected through the oil passage 201e to the relay valve 26.

The other D-range pressure oil passage 202 leading to the manual valve is branched through the 2–3 shift valve 22, and one branch oil passage 202a is connected through an orifice to a brake B-2 oil passage 204. This oil passage 204 is connected through the B-2 release valve 24 and a check valve to the oil passage 202d and through an orifice to the accumulator 27. The other branch oil passage 202b is connected through the 3–4 shift valve 23 to the hydraulic servo of the clutch C-2.

The 3–4 shift valve 23 is so connected through a solenoid valve signal pressure oil passage 208 to the B-2 release valve 24 as not only to provide and interrupt the communication between the two oil passages 201b and 202b but also to apply a solenoid valve SL3 signal pressure ($P_{SL3}$) to the spool end of the B-2 release valve 24.

The B-2 release valve 24 is formed with a bypass circuit for accelerating the drainage of the oil passage of the accumulator 27 at the release end of the brake B-2 and is equipped with a spring-loaded spool 241. The B-2 release valve 24 is fed at the end of the spool 241 with the signal pressure ($P_{SL3}$) of the solenoid valve SL3 by way of the 3–4 shift valve 23 so as to provide and interrupt the communication of a bypass oil passage 202d with the brake B-2 oil passage 204, to switch the communication of the D-range pressure oil passages 301c and 301g with the input port 254 of the B-3 control valve 25, and to switch the application of the signal pressure ($P_{SLU}$) to the pressure receiving area $A_2$ of the B-3 control valve 25 via an oil passage 206 and the connection of the oil passage, 206 to the drain. As a result, the input port 254 of the B-3 control valve 25 can be fed with the D-range pressure (PD) from the two oil passages 201c and 201g through the B-2 release valve 24 in parallel.

The B-3 control valve 25 is constructed such that the oil pressure of the oil passage 201e leading to the output port 255 is regulated by controlling the input port 254 with one and the drain port 257 with the other of the two lands, which are formed on the spool 251, by a feedback pressure fed to the end of the spool 251 through a feedback signal pressure inport 256. The construction is further made such that a plunger 252 arranged coaxially with the spool 251 pushes the spool 251 when it is fed at its end face with the brake B-2 applying pressure of an oil passage 204a leading to the oil passage 204 of the brake B-2 through the 2–3 shift valve 22. This B-3 control valve 25 is further equipped with the plunger which is disposed at the opposite side of the plunger 252 and which is made separate of the spool 251 for compressing a spring 258 at a pressure regulating time to substantially acts integrally with spool 251, such that the solenoid signal pressure ($P_{SLU}$) can be applied to and released from one end face of the plunger 253 at all times and the other end face via the oil passage 206 through the B-2 release valve 24.

Incidentally, the relay valve 26 is a springloaded spool type change-over valve, and the brake B-2 pressure of the oil passage 204 and the line pressure, ($P_L$) are fed in opposite directions to the end of the spool at the spring-loaded side and to the other spool end, to switch the communications between the brake B3 oil passage 201f and the oil passages 201e and 201h.

Figure 6:
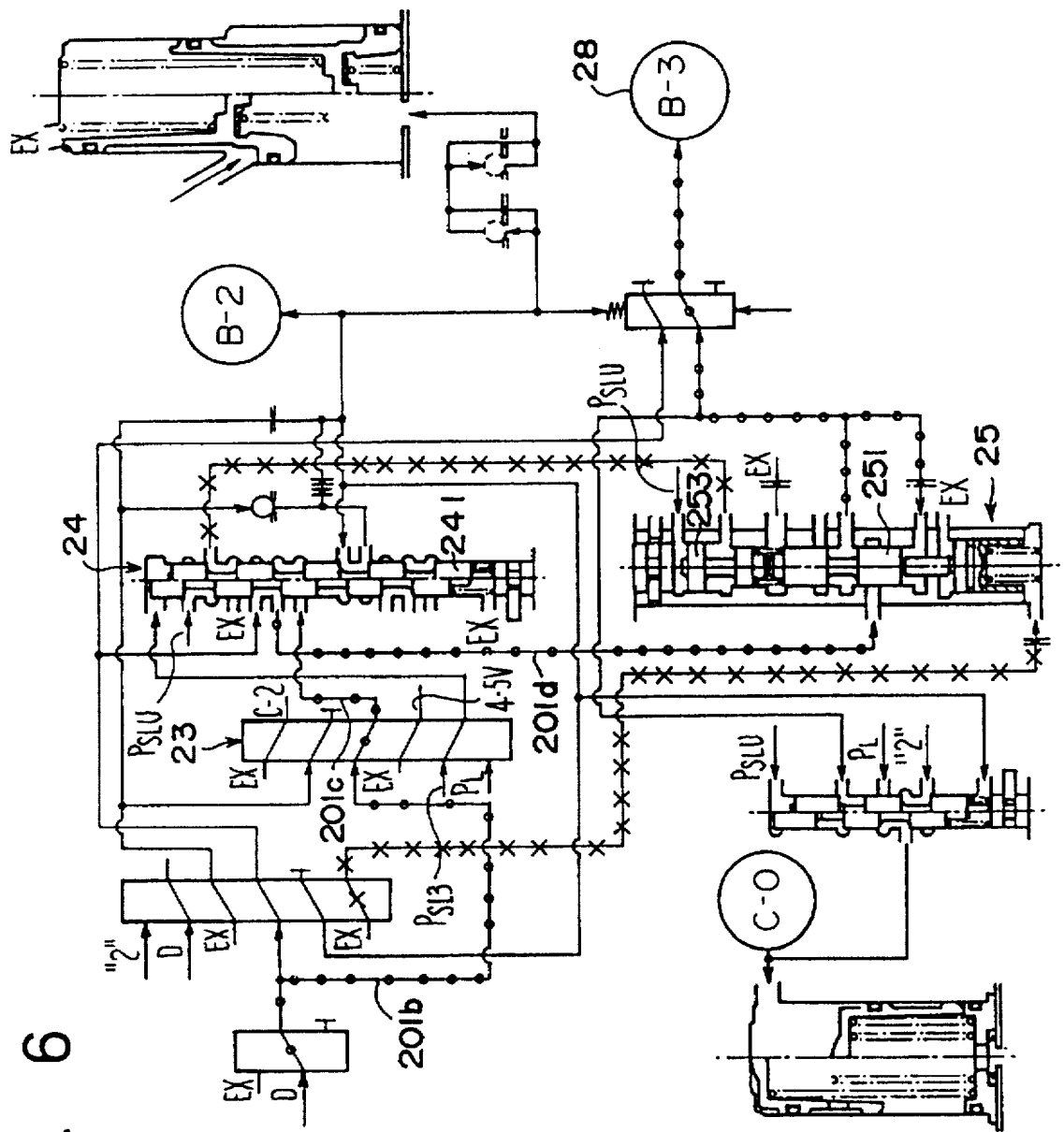
FIG. 6 is a circuit diagram showing a portion of the hydraulic control system of the automatic transmission with the oil passage connections in a 2nd-speed steady state.
Figure 7:
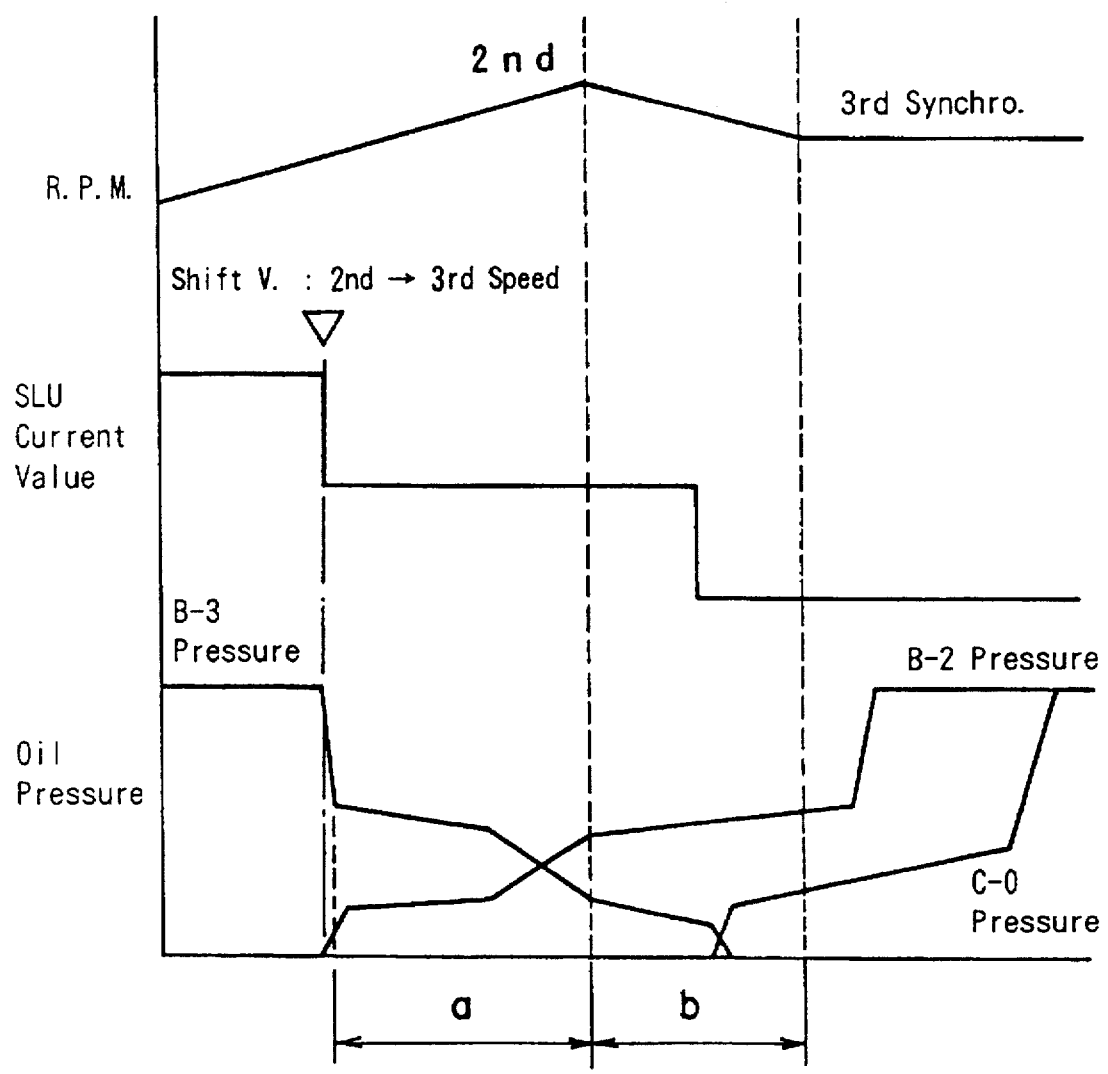
FIG. 7 is a time chart of the automatic transmission at a 2nd→3rd shifting time.

With the circuit thus constructed, in a 2nd-speed steady state, the solenoid valve SL3 is OFF, and the solenoid signal pressure ($P_{SL3}$) is applied through the 3–4 shift valve 23 so that the B-2 release valve 24 takes the righthand half position of FIG. 6. The signal pressure ($P_{SLU}$) at the side of the pressure receiving area $A_4$ of the plunger 253 of the B-3 control valve 25 is released so that the B-3 control valve 25 has a large gain. The D-range pressure ($P_D$) is fed from the passages 201b and 201c of the 3–4 shift valve 23 through the B-2 release valve 24 to the hydraulic servo 28 through the B-3 control valve 25 so that the brake B-3 pressure rises to the line pressure ($P_L$). As a result, In the 2nd-speed (2nd) steady state, the spool 251 is locked in the lowermost position of the drawing, whereas the spool 241 of the B-2 release valve 24 is brought to the lower position of the drawing by applying the aforementioned solenoid valve SL3 signal pressure ($P_{SL3}$).

In case, however, the input torque is high in the high throttle opening state so that the feed pressure of the B-3 control valve 25, i.e., the line pressure ($P_L$) rises over a predetermined value, as described above, the B-3 control valve 25 is brought into the pressure regulating state to suppress the brake B-3 pressure at a predetermined value. In this case, as described above, the plunger 252 having no oil pressure applied can be brought apart from the spool 251 by the vibration or the like, but is held in abutment against the spool 251 by the biasing force of the spring 259 which is arranged according to the present invention.

If a 2nd→3rd shift is decided in this state, the 2–3 shift valve 22 is switched to the 3rd speed side, as shown in FIGS. 1 to 7, and the control current of the signal pressure generating means is also lowered to start the feed of the D-range pressure ($P_D$) as the brake B-2 pressure through the 2–3 shift valve 22 to the servo means 29. At this time, the brake B-3 pressure or the releasing pressure is regulated by the B-3 control valve 25 to the minimum pressure (as in the section a) necessary for keeping the torque transmission at the 2nd speed in accordance with the rise of the brake B-2 pressure. When the fast fill of the brake B-2 by the hydraulic servo 29 is ended and followed by an inertia phase, the torque transmission from the 2nd speed to the 3rd speed occurs in the feedback control (as in the second b) by the backpressure control of the B-2 accumulator 27 so that the output r.p.m. gradually drops. The inertia phase Is ended before long, and the r.p.m. is raised again by the 3rd-speed synchronization. Then, the end of the shift is judged. At the end of the accumulation of the B-2 accumulator 27, the relay valve 26 is switched, and the shift is ended by closing the brake B-3.

FIG. 8 plots the changes in the oil pressures which are applied to the individual pressure receiving areas of the B-3 control valve 25 at the aforementioned 2nd→3rd shifting time. The releasing pressure ($P_{S3}$) of the brake B-3 drops at first according to the drop of the signal pressure ($P_{SLU}$). In case a play exists in this course till the plunger 252 comes into abutment against the spool 251, the drop of the releasing pressure ($P_{S3}$) is delayed, as indicated by a broken curve in FIG. 8, till the application of the applying pressure ($P_{B2}$) against the signal pressure ($P_{SLU}$). However, the disturbance of the control characteristics can be prevented by arranging the spring 259 according to the present invention.

In the valve of the type having its valve member made of a spool, generally speaking, in case the pressure regulation is effected by opening/closing the input port with one of the opposed lands, the oil pressure to be fed to that valve acts upon the other land face of the spool, while being outputted to flow between the lands of the valve member of the pressure regulator valve, so that a flow force in the valve closing direction is established at the spool. As a result, in case the valve of the aforementioned spool type is used for regulating the pressure, the so-called "disturbance" for obstructing the pressure regulation is established by the flow force. This relation is expressed by the following equation if: a releasing pressure to be controlled is designated at $P_R$: the applying pressure at $P_A$; the signal pressure at $P_S$; the areas for receiving those pressures at $S_R$, $S_A$ and $S_S$; and the disturbance at F:

$$P_R = (P_S \cdot S_S - P_A \cdot S_A - F)/S_R.$$

It is understood that the pressure receiving area ($S_R$) of the releasing pressure ($P_R$) may be increased so as to reduce the influence of the disturbance (F) upon the releasing pressure ($P_R$). However, the relation among the aforementioned pressure receiving areas is restricted such that the control gain of the pressure regulator valve, i.e., the relation of the level of the releasing pressure ($P_R$) to that of the signal pressure ($P_S$) has to be set to a value suitable for the control. This restriction limits the aforementioned pressure receiving area ($S_R$) in case both the applying pressure ($P_A$) and the releasing pressure ($P_R$) are applied to the pressure receiving area formed on one valve member.

In order to minimize the ratio of the disturbance by enlarging the pressure receiving areas, therefore, it is effective to adopt the construction according to our preceding invention or the present embodiment, in which the pressure receiving area ($S_R$) is retained without the aforementioned restriction by forming the pressure receiving area for receiving the releasing pressure ($P_R$) and the pressure receiving area for receiving the applying pressure ($P_A$) on the different valve members.

In short, according to the present embodiment, the spool 251 and the plunger 258, which have the present embodiment $A_1$ to be fed in one direction with the signal pressure ($P_{SLU}$) and the pressure receiving area $A_2$ to be fed in the other direction with the feedback pressure ($P_{B3}$) from the hydraulic servo 28, and the plunger 252, which has the present embodiment $A_3$ to be fed In the other direction with the oil pressure ($P_{B2}$) to the hydraulic servo 29, are made separate of each other in the B-3 control valve 25. As a result, the influence of the disturbance by the flow force or the like can be reduced by setting the pressure receiving area $A_2$ without being restricted by the relation to the remaining pressure receiving areas $A_1$ and $A_3$.

Moreover, the plunger 252 is biased to abut against the spool 251 and the plunger 253 by the spring 259. As a result, the plunger 252 is not brought apart from the spool 251 and the plunger 253, even in case the input torque is high as a result of a high throttle opening state to feed the B-3 control valve 25 with a high pressure with the brake B-3 being applied to apply no oil pressure to the pressure receiving area of the plunger 252. As a result, when the feed of the oil pressure to the hydraulic servo 29 is started by the 2–3 shift valve, that is, in case the applying pressure by the feed of the oil pressure to the hydraulic servo 29 of the brake B-2 is applied to the pressure receiving area $A_3$ in case the 3rd speed is to be established by releasing the brake B-3 from its engaging state and by applying the brake B-2, the pressure regulating control in relation to the applying pressure from the hydraulic servo 29 can be instantly started to cause no response delay because the spool 251 and the plunger 258 are in abutment against the plunger 252.

Although the present invention has been described in detail in connection with its embodiment, it should not be limited thereto but can be modified in various specific constructions within the scope of the claim. Especially in the foregoing embodiment, the first valve member is constructed of the spool and plunger which are made separate of each other to prevent the signal pressure dispersed at the beginning of the output of the signal pressure generating means from directly acting upon the spool, although this construction is not essential to the present invention. Moreover, the bias means should not be limited to the spring but can be exemplified by applying a constant oil pressure to the second valve member.

What is claimed is:

1. A hydraulic control system for an automatic transmission wherein a predetermined gear stage is established by applying a first frictional engagement element and releasing a second frictional engagement element, comprising a first hydraulic servo for receiving a first oil pressure and for actuating said first frictional engagement element responsive to the first oil pressure; a second hydraulic servo for receiving a second oil pressure and for actuating said second frictional engagement element responsive to the second oil pressure; change-over means for switching the feed of an oil pressure to said first hydraulic servo; signal pressure generating means for generating a signal pressure; and a pressure regulator valve for receiving an oil pressure, for regulating the received oil pressure responsive to the signal pressure and for feeding the regulated pressure as the second pressure to said second hydraulic servo, wherein said pressure regulator valve includes: a first valve member having a first pressure receiving area for receiving the signal pressure to urge said first valve member in a first direction; a second valve member arranged coaxially with said first valve member and adapted to come into abutment against said first valve member to urge said first valve member in a second direction opposite said first direction, said second valve member having a second pressure receiving area for urging said second valve member in the second direction and into abutment against said first valve member, responsive to the first, oil pressure received through said change-over means; and bias means for biasing said second valve member in the second direction and into abutment against said first valve member.

2. A hydraulic control system for an automatic transmission according to claim 1,
wherein said first valve member further has a third pressure receiving area for receiving a feedback pressure from said second hydraulic servo in the second direction.

3. A hydraulic control system for an automatic transmission according to claim 1,
wherein said bias means is a spring.

4. A hydraulic control system for an automatic transmission according to claim 1,
wherein said bias means is a constant oil pressure.

5. A hydraulic control system for an automatic transmission according to claim 2, wherein said bias means is a spring.

6. A hydraulic control system for an automatic transmission according to claim 2, wherein said bias means is a constant oil pressure.

7. A hydraulic control system according to claim 1, further comprising an input port for receiving D-range pressure and an output port for outputting the regulated pressure to said second hydraulic servo and wherein said first valve member includes first and second lands for throttling, respectively, said input port and said output port to provide the regulated pressure.

8. A hydraulic control system according to claim 2, further comprising an input port for receiving D-range pressure and an output port for outputting the regulated pressure to said second hydraulic servo and wherein said first valve member includes first and second lands for throttling, respectively, said input port and said output port to provide the regulated pressure.

* * * * *

UNITED STATES PATENT AND TRADEMARK OFFICE
CERTIFICATE OF CORRECTION

PATENT NO. : 5,674,154
DATED : October 7, 1997
INVENTOR(S) : TSUKAMOTO et al

Page 1 of 2

It is certified that error appears in the above-indentified patent and that said Letters Patent is hereby corrected as shown below:

IN THE ABSTRACT

Line 2, before "stage" insert --gear--.

Col. 2, line 40, after "response" delete the comma --,-- line 55, "Fig. 8" should read --Fig. 3--.

Col. 3, line 50, delete "80" insert --30--; and line 58, "Fig. 8" should read --Fig. 3--.

Col. 5, line 12, after "area" insert --$A_1$-- line 20, delete "Then" insert --when--; and line 47, "208" should read --205--.

Col. 7, line 63, "258" should read --253--.

UNITED STATES PATENT AND TRADEMARK OFFICE
CERTIFICATE OF CORRECTION

PATENT NO. : 5,674,154
DATED : Oct. 7, 1997
INVENTOR(S) : Tsukamoto, et al

It is certified that error appears in the above-identified patent and that said Letters Patent is hereby corrected as shown below:

Col. 8, line 23, "258" should read --253--

Signed and Sealed this

First Day of December, 1998

Attest:

BRUCE LEHMAN

Attesting Officer

Commissioner of Patents and Trademarks